Patented July 1, 1930

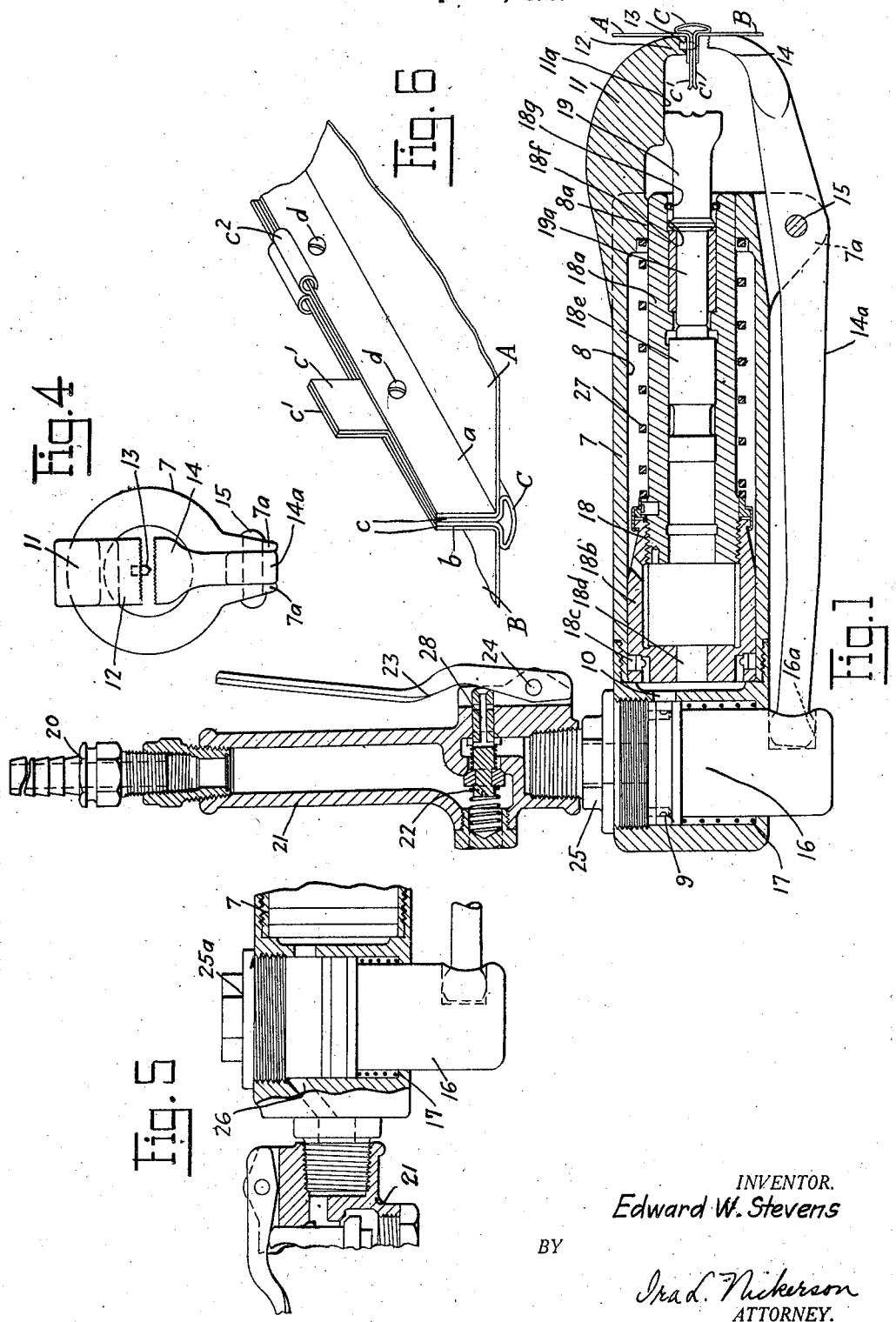

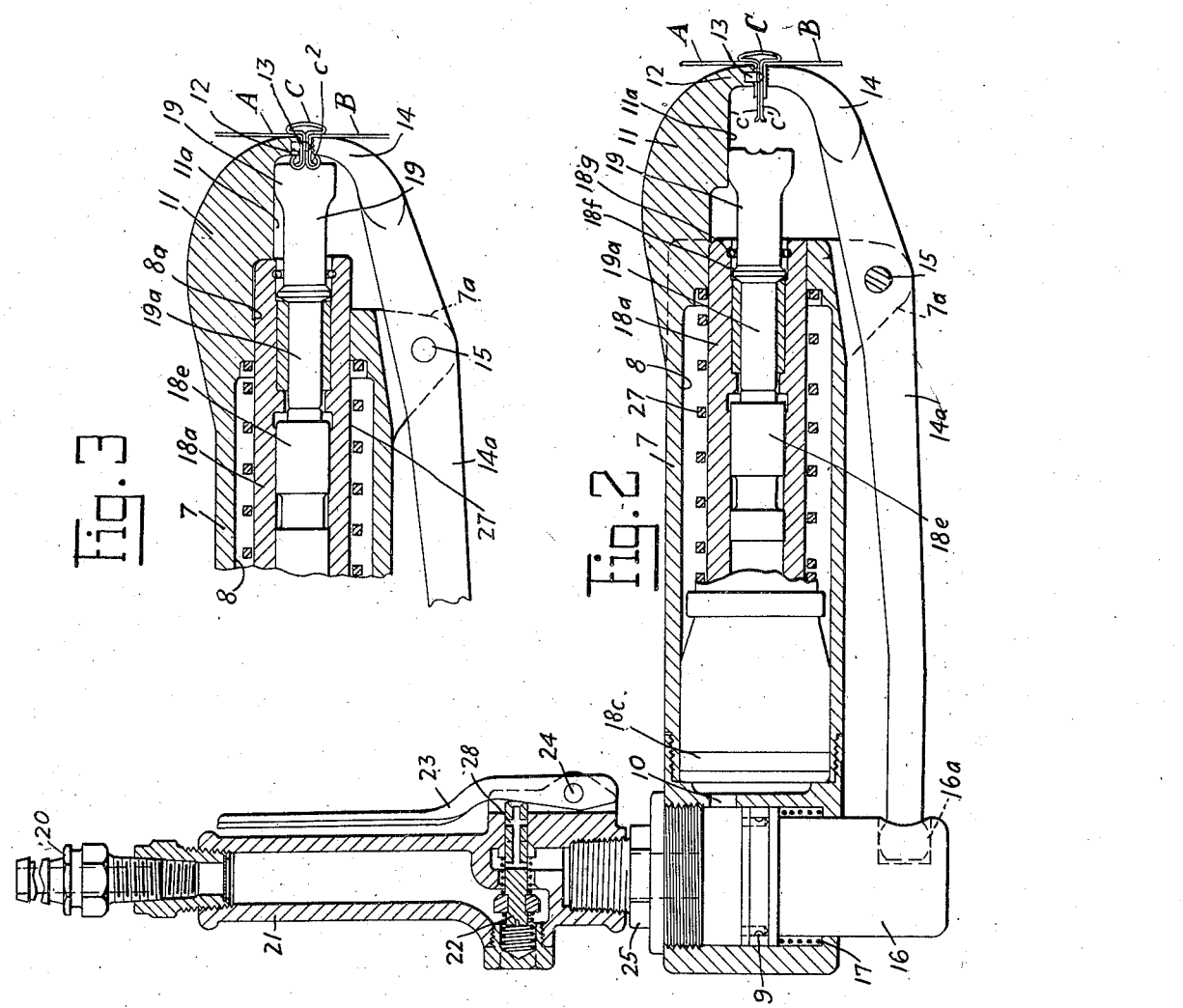

1,769,002

UNITED STATES PATENT OFFICE

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY

BEADING TOOL

Application filed September 18, 1926. Serial No. 136,345.

This invention relates to percussive tools adapted and intended for beading work. More specifically it relates to a fluid pressure percussive tool developed for beading work in the construction of automobile bodies, but certain features of the invention are capable of general application.

The particular work referred to consists in clinching or forcing a bead upon sections of the molding strip used on automobile bodies. The molding strip covers the seam or meeting portions of the metallic body plates and the flanged portions of the molding extend between the flanges of the body sections or plates and a suitable distance beyond. The extended portions of the molding flanges are curled over the flanges of the body sections for the purpose of drawing the molding up tight against the body sections and to hold the latter firmly in place. This clinching or curling operation has previously been performed by heavy pressure tools.

One object of the invention is to devise a percussive tool which is light in weight and easy to handle for use in curling and beading operations. Another object is to direct the tool accurately to the work. Other objects will be apparent from the detailed description which follows:

In order to illustrate the invention one concrete embodiment thereof is shown in the accompanying drawings in which:

Fig. 1 is a vertical, sectional view through the beading tool with the parts in the position when first applied to the work;

Fig. 2 is a view similar to Fig. 1 showing the position of the parts shortly after the opening of the throttle;

Fig. 3 is a fragmentary sectional view of the forward end of the tool at the completion of the work;

Fig. 4 is a front or right end elevational view of the tool;

Fig. 5 is a sectional view of the rear or left end of the tool indicating a different connection for the throttle handle;

Fig. 6 is a perspective view indicating a portion of an automobile body and showing the flanges of the molding strip before and after the beading operation.

Fig. 6 illustrates the work to be performed. Sections A and B of the sheet steel outer covering of an automobile body are shown with their flanged portions $a$ and $b$ disposed in adjacent parallelism with the flanges $cc$ of a molding strip C extending therebetween, the rounded head of the molding strip being arranged to cover the seam or joint between body sections A and B. At longitudinal spaced points the flanges $cc$ of the molding strip have extended portions $c'$ projecting beyond the flanges $a$ and $b$ for a suitable distance, which portions are arranged to be curled or beaded over into gripping engagement with the flanges $a$ and $b$ as indicated at $c^2$ so as to form a clinch. The beading or curling operation draws the molding strip C tightly against the body sections and holds the parts firmly in place. The flanges $a$, $b$ and $c$ have registering bores $d$ therethrough adjacent to the extended portions $c'$ for a purpose presently to be described. After the curling or beading operation is completed bores $d$ are utilized for the insertion of rivets more solidly to unite the parts.

The tool for performing the above indicated beading or curling operation, comprising the present invention, will now be described. This tool comprises a casing 7 generally cylindrical in form having an axial bore or chamber 8 with a reduced opening $8^a$ adjacent the front of the casing and at the rear of the casing a transverse bore or chamber 9 separated from chamber 8 by a partition having a port 10 therethrough. Casing 7 at the front end has an extension 11 providing a fixed jaw 12 carrying a dowel pin 13. Opposed to jaw 12 is a movable jaw 14 carried by a lever $14^a$ pivotally mounted upon a pin 15 secured in ears $7^a$ (Fig. 4) extending from casing 7. The rear end of lever $14^a$ is received in a socket $16^a$ formed in the extension of a piston 16 slidable in transverse chamber 9. A spring 17 in chamber 9 bearing against a shoulder on piston 16 yieldingly urges and holds the piston at the limit of its inward movement and jaw 14 in its open position.

A pneumatic hammer unit 18 is slidably disposed within chamber 8 of the casing, the cylinder 18ª of the unit slidably fitting the reduced portion of the bore 8ª while the back head 18ᵇ slidably fits main bore 8, a cylinder ring 18ᶜ insuring a tight connection. An axial bore 18ᵈ in head 18ᵇ admits motive fluid to operate the pneumatic hammer which may be of any suitable or desired type. The piston 18ᵉ of the hammer imparts its blows to a die 19, the shank end 19ª of which may be slidably received in a bushing 18ᶠ. A retainer ring 18ᵍ may cooperate with a collar on die 19 to retain the die in operative position. Fixed jaw 11 provides a guide surface 11ª to cooperate with one of the flat sides of die 19.

Pressure fluid to actuate the tool may be admitted from a supply pipe 20 to the interior of a throttle handle 21 having a throttle valve 22 of any suitable or desired type operated by a throttle lever 23 pivoted at 24, the handle being attached to a cap or head 25 secured in the open end of chamber 9. If desired, the throttle handle may be disposed in axial alignment with casing 7, as indicated in Fig. 5, in which case a solid plug 25ª is used to close the open end of chamber 9 and a passage 26 is bored in the rear of the casing to admit motive fluid from throttle handle 21 into chamber 9.

The operation of the tool is as follows: the operator grasps throttle handle 21 and casing 7 and passes the open jaws 12, 14, over the flanged portions $a$, $b$, $c$, of assembled body sections A, B, and molding strip C, forcing the dowel pin 13 into one of the bores $d$ and pressing fixed jaw 12 firmly against the flange of section A (Fig. 1). He then opens throttle valve 22 admitting motive fluid to chamber 9 which forces piston 16 outwardly against spring 17 and causes inward movement of jaw 14 to clamping contact with the flange of body section B. Outward movement of piston 16 uncovers bore 10 admitting motive fluid into axial bore 8 to force hammer unit 18 outwardly against the pressure of its spring 27. Spring 17 is weaker than spring 27 in order to effect initial clamping of the work and the aligning of the same with die 19 before the hammer is brought into action. The outward movement of the hammer unit brings die 19 into engagement with the ends of flanged extensions $c'$ (Fig. 2) whereupon the motive fluid passing into the hammer through bore 18ᵈ sets piston 18ᵉ into operation delivering rapid but light blows to the shank end 19ª of die 19. The hammer blows accurately directed to the work by die 19 quickly curl the extensions $c'$ outwardly into the bead or clinch form $c^2$ (Fig. 3), the hammer unit advancing against the tension of spring 27 as the work progresses. Upon closing throttle valve 22 the pressure fluid in chambers 8 and 9 is quickly relieved through vent passages 28 in the stem of throttle valve 22. Since spring 27 is stronger than spring 17, hammer unit 18 and piston 16 return to their inoperative positions in the reverse order to that in which they advance to the work.

While a preferred form of the invention has been herein shown and described, it is to be understood that the invention is not limited to the specific details thereof but covers all changes, modifications and adaptations within the scope of the appended claims.

I claim as my invention:

1. A tool of the class described comprising a casing having a hammer unit slidable therein, a bead forming die carried by said hammer unit and means accurately directing said die to the work comprising clamping means engaging the work and disposing the same in line with said die, said means being arranged to grip and compress the work in a plane substantially at right angles of the axis of said unit.

2. A tool of the class described comprising a casing having a hammer unit slidable therein, a bead forming die carried by said hammer unit, and means accurately directing said die to the work comprising fixed and movable clamping jaws for engaging the work, said fixed jaw providing a guide for said die.

3. A tool of the class described comprising a casing having a hammer unit slidable therein, a bead forming die arranged to be actuated by said hammer unit and means accurately directing said die to the work comprising fixed and movable clamping jaws for engaging the work, said fixed jaw providing a guide for said die, and a dowel pin on one of said jaws to engage an opening in the work.

4. A tool of the class described comprising a casing having a hammer unit slidable therein, a bead forming die arranged to be actuated by said hammer unit and means accurately directing said die to the work comprising fixed and movable clamping jaws for engaging the work, said fixed jaw providing a guide for said die, and a dowel pin on said fixed jaw to engage an opening in the work.

5. A tool of the class described comprising a casing providing a chamber, a hammer unit slidable in said chamber, a die to be operated by said unit, and clamping means for disposing the work in line with said die including an extension on said casing and a member movable substantially at right angles to the axis of said die toward and away from said extension.

6. A tool of the class described comprising a casing providing a chamber, a percussive motor slidable in said chamber, a die carried by said motor and arranged to be operated by the latter, a fixed member projecting from said casing and providing a guide for said die, and means for clamping the work against said member.

7. A tool of the class described comprising a casing providing a chamber, a hammer unit slidable in said chamber, a die to be operated by said unit, a fixed member projecting from said casing and providing a guide for said die, a dowel pin projecting from said member to engage an opening in the work, and means for clamping the work against said member.

8. A tool of the class described comprising a casing providing a chamber, a hammer unit slidable in said chamber, a die to be operated by said unit, and clamping means movable substantially transverse to the axis of said unit for disposing the work in line with said die, said clamping means being actuated automatically before said hammer unit and said die are brought to operation.

9. A tool of the class described comprising a casing providing two chambers, a hammer unit slidable in one chamber, a die to be operated by said unit, clamping means movable at an angle to the axis of said unit for disposing the work in line with said die, and means in the other chamber for operating said clamping means.

10. A tool of the class described comprising a casing providing two chambers, a pneumatic percussive motor slidable in one chamber, a die to be operated by said motor, clamping means for disposing the work in line with said die, and means for operating said clamping means including a piston in the other chamber.

11. A fluid pressure tool comprising a casing, a fixed jaw projecting from said casing for engaging the work, a movable jaw pivoted to said casing for clamping the work to said fixed jaw, a fluid pressure hammer within said casing having a die movable into contact with the work, and fluid pressure means for actuating first said movable clamping jaw and then said hammer and for releasing the same in the reverse order.

12. A fluid pressure tool comprising a casing, a fixed jaw projecting from said casing for engaging the work, a movable jaw pivoted to said casing for clamping the work to said fixed jaw, a piston for actuating said movable jaw, a fluid pressure hammer within said casing having a die movable into contact with the work, resilient means yieldingly holding both said piston and said hammer in inoperative positions, and means for admitting pressure fluid to operate said piston and said hammer in succession.

13. A fluid pressure tool comprising a casing, a fixed jaw projecting from said casing for engaging the work, a movable jaw pivoted to said casing for clamping the work to said fixed jaw, a piston for actuating said movable jaw, a fluid pressure hammer within said casing having a die movable into contact with the work, springs yieldingly holding both said piston and said hammer in inoperative positions, the hammer spring being more powerful than the piston spring to insure proper sequence of operation, and means for admitting pressure fluid to operate both said piston and said hammer.

14. A fluid pressure tool comprising a casing, a fixed jaw projecting from said casing for engaging the work, a movable jaw pivoted to said casing for clamping the work to said fixed jaw, a piston for actuating said movable jaw, a fluid pressure hammer within said casing having a die movable into contact with the work, said fixed jaw providing a guide for said die, resilient means yieldingly holding both said piston and said hammer in inoperative positions, and means for admitting pressure fluid to operate said piston and said hammer in succession.

15. A fluid pressure tool comprising a casing providing two chambers, a fluid pressure hammer slidable in one chamber, a die carried by said hammer, clamping means for disposing the work in line with said die, means in the other chamber for operating said clamping means, and means for admitting pressure fluid first to said last named chamber and thence under control of the means therein into said hammer chamber whereby the work is clamped prior to the operation of said hammer.

16. A fluid pressure tool comprising a casing providing two chambers, a fluid pressure hammer slidable in one chamber, a die carried by said hammer, clamping means for disposing the work in line with said die, a piston in the other chamber for actuating said clamping means, means for admitting pressure fluid to said piston chamber, and means controlled by said piston for admitting pressure fluid to said hammer chamber so that the work may be clamped prior to the operation of said hammer.

17. A fluid pressure tool comprising a casing providing two chambers, a fluid pressure hammer slidable in one chamber, a die carried by said hammer, clamping means for disposing the work in line with said die, a piston in the other chamber for actuating said clamping means, and means for admitting pressure fluid to said piston chamber, there being a port between said chambers controlled by said piston.

18. A fluid pressure tool comprising a casing providing two chambers, there being a port connecting said chambers, a fluid pressure hammer slidable in one chamber, a die carried by said hammer, a spring within said chamber engaging said hammer yieldingly to maintain the latter in inoperative position, a projection on said casing presenting a fixed clamping jaw for the work and a guide for said die, a movable clamping jaw pivoted to said casing, a piston in the other chamber for operating said movable jaw, a spring in said last named chamber yieldingly maintaining said piston in inoperative position, and a manually operable throttle valve for controlling the admission and exhaust of pressure fluid to and from said piston chamber, said piston controlling the port establishing communication between said chambers.

19. A fluid pressure tool comprising a casing providing two chambers, there being a port connecting said chambers, a fluid pressure hammer slidable in one chamber, a die carried by said hammer, a spring within said chamber engaging said hammer yieldingly to maintain the latter in inoperative position, a projection on said casing presenting a fixed clamping jaw for the work and a guide for said die, a dowel pin on said fixed jaw for registering the latter with the work, a movable clamping jaw pivoted to said casing, a piston in the other chamber for operating said movable jaw, a spring in said last named chamber yieldingly maintaining said piston in inoperative position, said piston spring being weaker than said hammer spring to insure proper sequence of operation of said piston and of said hammer, and a manually operable throttle valve for controlling the admission and exhaust of pressure fluid to and from said piston chamber, said piston controlling the port establishing communication between said chambers.

20. A tool of the class described comprising a casing providing a chamber, a hammer unit slidable in said chamber, a die to be operated by said unit, and clamping means for disposing the work in line with said die including an extension on said casing and a pivoted member arranged for swinging movement toward and away from said extension.

21. A tool of the class described comprising a casing providing a chamber, a hammer unit slidable in said chamber, a die to be operated by said unit, and clamping means for disposing the work in line with said die including a fixed extension on said casing and a member pivotally mounted on said casing for swinging movement toward and away from said extension.

Signed by me at Detroit, Michigan, this 30th day of August, 1926.

EDWARD W. STEVENS.